June 4, 1946.  D. RICHARDS  2,401,316
MOTOR CAR
Filed April 13, 1942   3 Sheets-Sheet 3
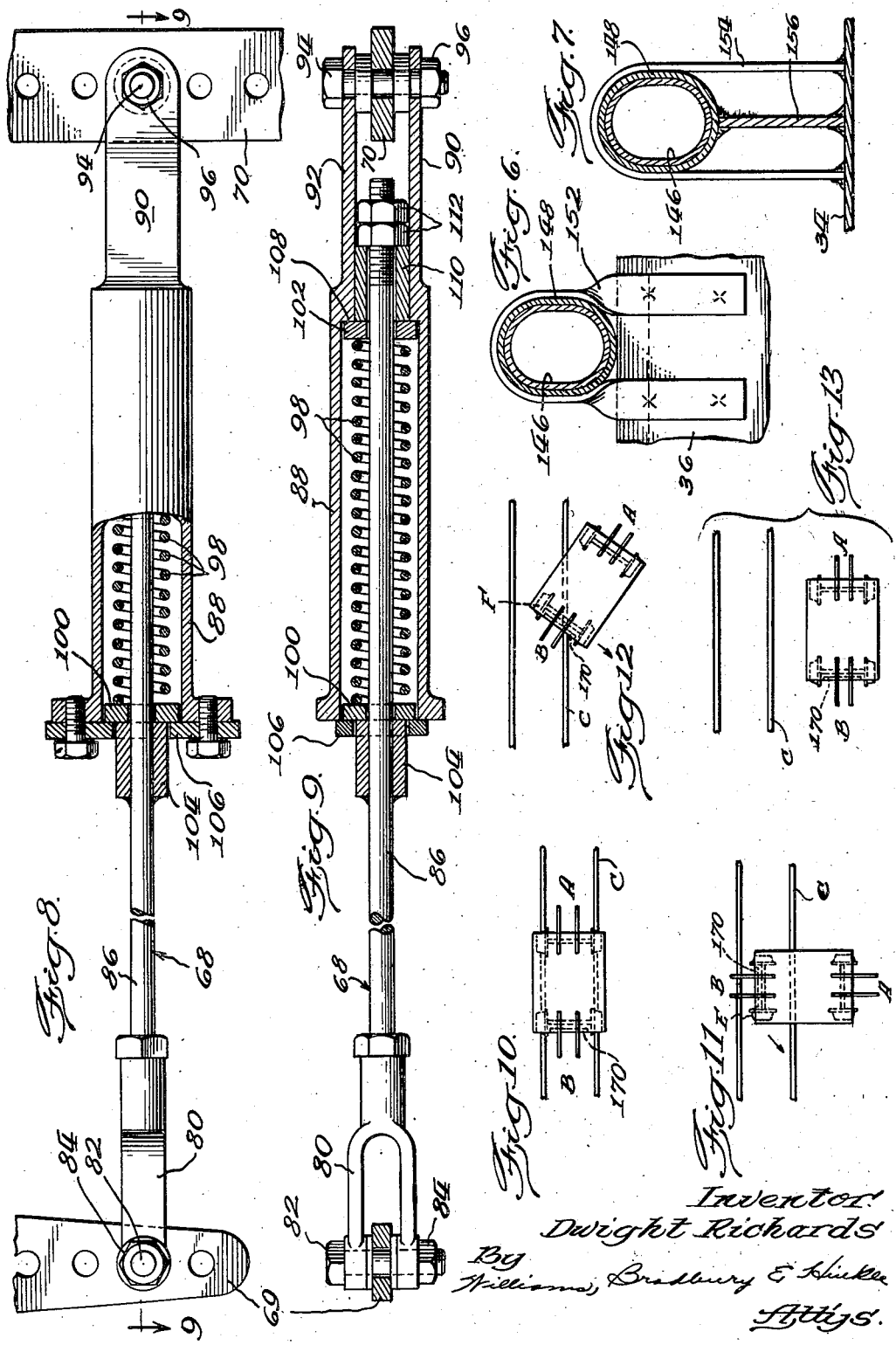

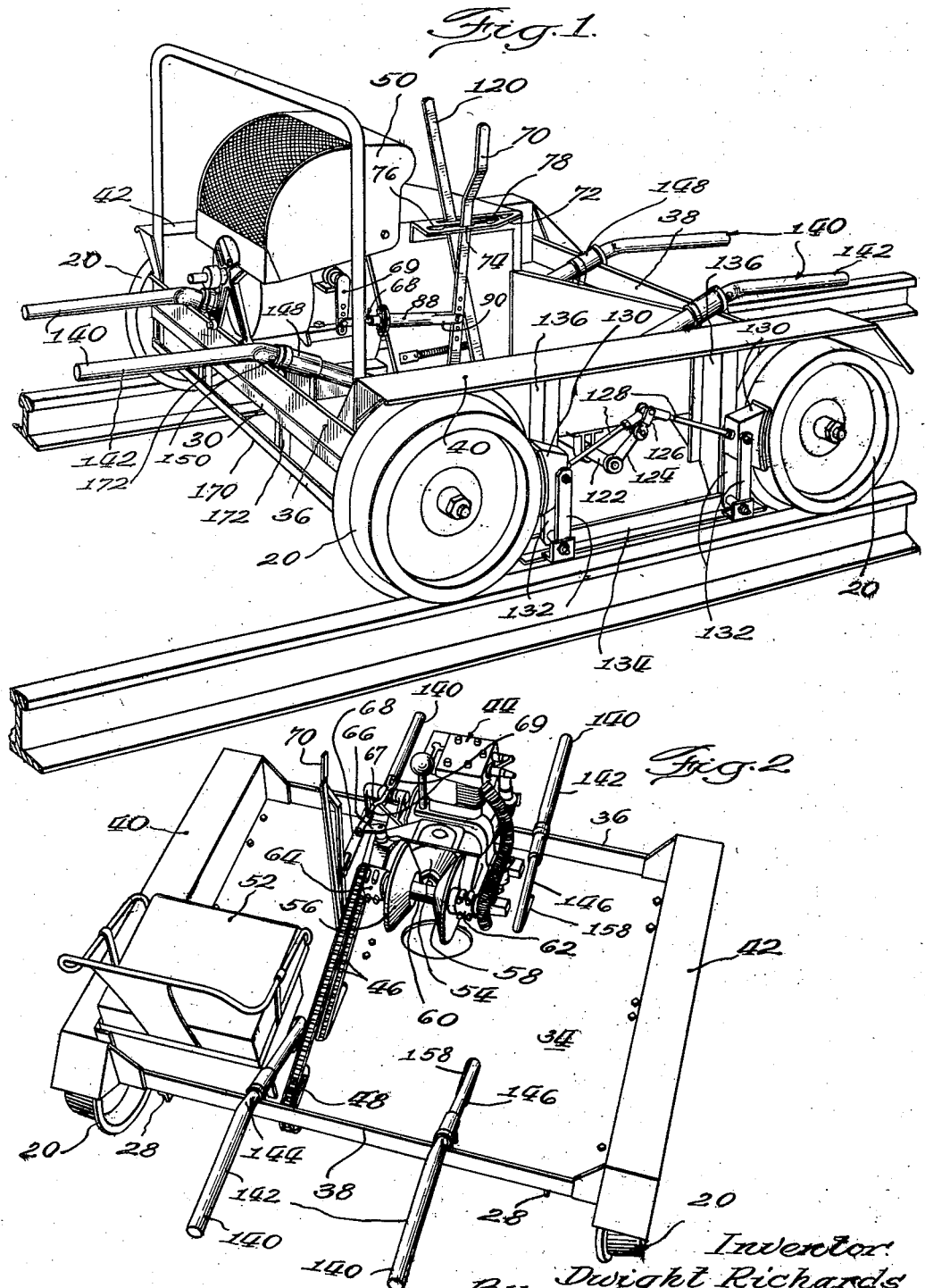

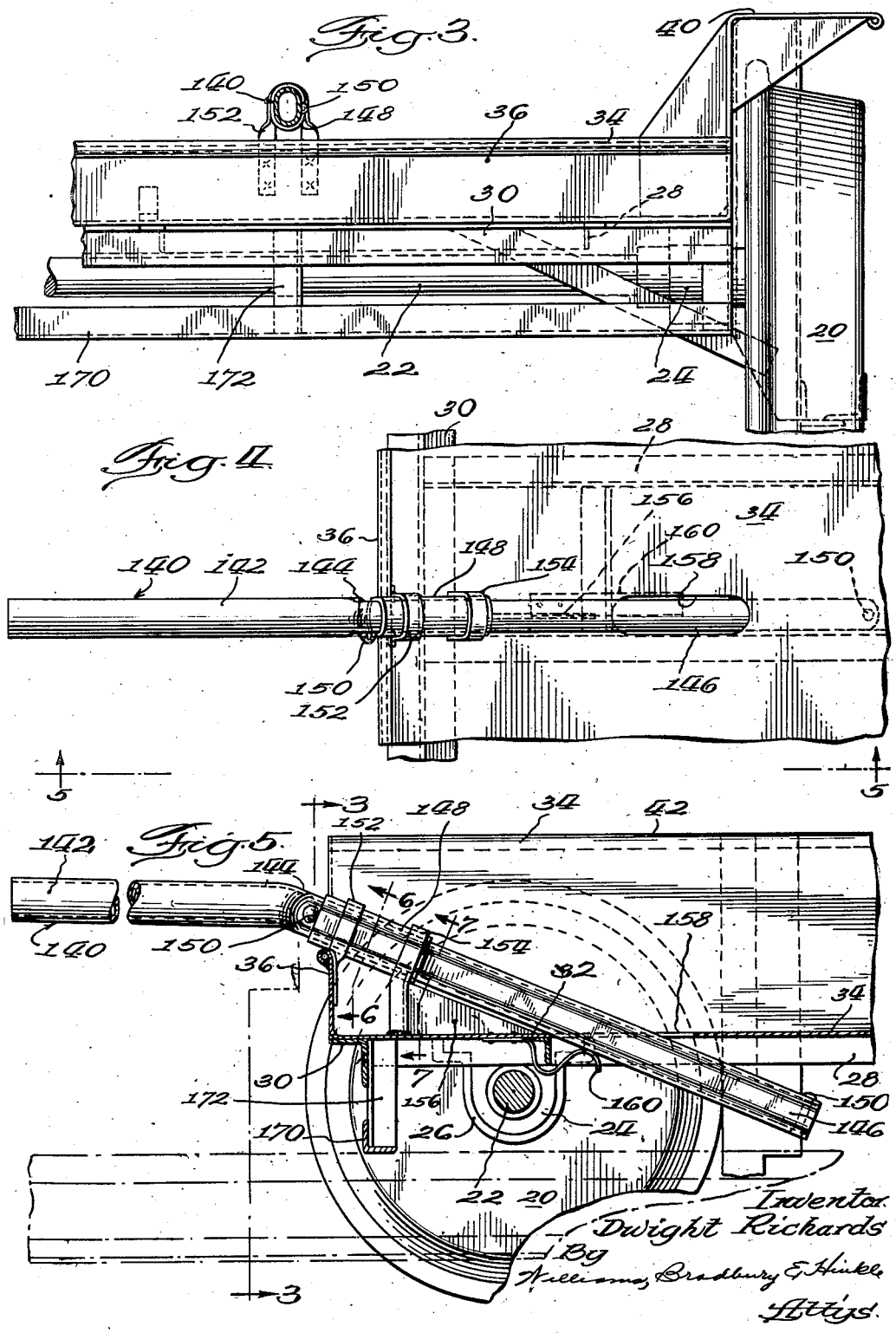

Patented June 4, 1946

2,401,316

UNITED STATES PATENT OFFICE 2,401,316

MOTORCAR

Dwight Richards, Harvey, Ill., assignor to The Buda Company, Harvey, Ill., a corporation of Illinois Application April 13, 1942, Serial No. 438,675

1 Claim. (Cl. 105—162)

My invention relates to motor cars and is more particularly concerned with motor cars of the type used by railroads for the transportation of employees engaged in track inspection, maintenance and repair and the tools and equipment which they must have with them to perform their various duties. Certain of the features disclosed herein are disclosed and claimed in my co-pending divisional application, Serial No. 623,244, filed October 19, 1945.

Such motor cars must be frequently removed from the track to permit the passage of trains and replaced as quickly as possible after the trains have passed. It is, therefore, essential that these motor cars be as light as possible consistent with the duties and services which they must perform and that they be capable of removal from and replacement on the tracks with a minimum of manual effort.

An object of my invention is to provide a motor car which is of light weight, sturdy construction, and which can be easily removed from, or placed upon, a railroad track by one man of ordinary strength.

Another and more specific object of my invention is to provide an improved handle construction whereby the motor car may be more readily lifted and manipulated in removing it from, and placing it upon, a railroad track.

Other objects and advantages of my invention will become apparent as the description proceeds.

In the drawings:

Fig. 1 is a front perspective view of a motor car embodying my invention;

Fig. 2 is a rear perspective view of the motor car of Fig. 1, but showing the addition of a seat for the operator of the vehicle;

Fig. 3 is a partial front elevation showing a skid rail and is taken on the line 3—3 of Fig. 5;

Fig. 4 is a fragmentary top view illustrating my novel handle construction;

Fig. 5 is a partial vertical section taken on the line 5—5 of Fig. 4;

Fig. 6 is a partial section taken on the line 6—6 of Fig. 5 illustrating a detail of the handle construction;

Fig. 7 is a partial section taken on the line 7—7 of Fig. 5 and likewise shows a detail of the handle construction;

Fig. 8 is a side elevation partially in section of the reversing controls;

Fig. 9 is a horizontal section taken on the line 9—9 of Fig. 8; and

Figs. 10, 11, 12 and 13 are diagrammatic views showing the successive steps in the preferred method of removing a motor car from a railroad track.

Referring to the drawings, it will be seen that I have illustrated therein a motor car having wheels 20 suitably flanged for operating on the rails of a conventional railroad track. These wheels are mounted on axles 22 (Fig. 5) rotatably carried in journal boxes 24 attached to the motor car frame by straps 26. The motor car frame comprises a plurality of longitudinal members 28 connected at intervals throughout their length by cross members such as the angle irons 30 and 32 shown in Fig. 5. It will be understood that the longitudinal members 28 are connected by additional cross members not shown in the drawings.

A sheet metal body 34 is bolted, riveted or otherwise suitably secured to the frame and preferably provides a flat floor best shown in Fig. 2. The ends of the sheet metal body are preferably bent upwardly as indicated at 36 and 38 and the sides of the body are bent upwardly and outwardly to form fenders 40 and 42. The body may be formed of a single piece of sheet metal or of several pieces secured together as preferred.

The motor car is driven by a light weight internal combustion engine preferably, but not necessarily, of the air cooled type, as indicated at 44. This engine drives a chain 46 leading to a sprocket wheel 48 on the rear axle which transmits the driving force to the rear wheels of the motor car. The engine and power transmitting mechanisms are ordinarily enclosed by a cover 50 shown in Fig. 1.

Any suitable seating arrangement may be provided for the operator and other passengers. In Fig. 2 a single seat 52 is shown in a convenient position for operation of the motor car controls by the occupant of the seat. Additional seats, of course, can be provided as required or other seating arrangements can be adopted where most of the platform is needed for transporting tools and other equipment.

In the embodiment shown in the drawings, the engine 44 drives a cone 54 which may be attached directly to the rear end of the engine crank shaft. This cone is adapted to drive either one of a pair of conical friction wheels 56 and 58 mounted on a longitudinally slidable shaft 60 carried in bearings 62 and 64. This shaft may be moved to a neutral position in which the cone 54 engages neither of the friction wheels, or to either extreme position wherein the cone engages one or the other of these friction wheels to drive the motor car forward or backward, as desired by the operator.

The position of the shaft 60 is controlled by an arm 66 on a vertical shaft. Arm 66 is connected by link 67, offset lever 69, and compound link 68 to a gear shift lever 70 which is pivoted at its lower end to the body or frame of the motor car. The upper end of the lever 70 extends through a slot in a guide 72 which has a lever receiving notch 74 for neutral position, a notch 76 for forward position and a third notch 78 for reverse position of the lever 70.

The particular driving arrangement which I have just described is particularly desirable for this type of motor car, since it is compact, light and has relatively few parts. It is also extremely simple and durable in service if it is protected against undue force pressing one of the driving wheels against the cone 54, since such undue force would tend to bend or cause a misalignment of the engine crank shaft. The compound link 68, shown more clearly in Figs. 8 and 9, has been expressly designed to prevent any undue force exerted on the gear shift lever from being transmitted to the friction wheels 56 and 58 and cone 54.

The compound link 68 comprises a clevis 80 pivotally connected by bolt 82 and nut 84 to arm 69 by way of any of the several holes provided in this arm. A rod 86 is threadedly attached to the clevis 80 and telescoped within a sleeve 88 pivotally attached to the gear shift lever 70 by way of arms 90 and 92 and bolt 94 and nut 96. The gear shift lever is preferably provided with a series of holes into any of which the bolt 94 may be inserted to give the desired relationship between this lever and the arm 66.

A spring 98 is interposed between the rod 86 and sleeve 88 and is confined between washers 100 and 102 which are slidable on the rod 86 and within the sleeve 88. As shown in Fig. 9, the washer 100 is resting against a collar 104, rigidly secured to the rod 86, and also against an inwardly directed flange 106 attached to an end of sleeve 88. In this figure washer 102 is resting against a shoulder 108 formed in the sleeve 88 and also against a collar 110 which abuts against nuts 112 threadedly secured to rod 86.

The construction and arrangement of these parts is such that when the lever 70 is moved from notch 74 to notch 76, sleeve 88 is moved to the left, as shown in Figs. 8 and 9, compressing spring 98 by the engagement of shoulder 108 with washer 102, whereby this washer is moved with sleeve 88. This compression of the spring 98 is transmitted to rod 86 through washer 100 and collar 104 and shifts this rod and arm 66, thereby shifting shaft 60 and causing one of the friction wheels to engage the cone 54.

The slot in guide 72 permits lever 70 to be moved only a slight distance in advance of notch 76 and this slight movement is not sufficient to completely compress spring 98. It is impossible for the operator to exert more force on arm 66 and its associated parts than is transmitted through the partially compressed spring 98. This spring, therefore, determines the maximum force with which the friction wheel can be compressed against the cone 54, as well as the normal driving force holding these parts in engagement. Because of the limited movement of lever 70 beyond notch 76, these two forces are essentially the same.

When it is desired to reverse the direction of movement of the motor car, the lever 70 is shifted to reverse notch 78. As this lever moves to the right of neutral notch 74, as viewed in Fig. 1, flange 106 engages collar 100 and causes it to move to the right with sleeve 88, thereby compressing spring 98 against washer 104 which is held against movement relative to rod 86 by collar 110 and nuts 112. In this direction also the lever 70 can move only a slight distance beyond notch 78 and compression of spring 98 is limited to a maximum which only slightly exceeds the normal operating compression of this spring. No undue force can be exerted on the cone 54 or the crank shaft to which it is connected.

The motor car illustrated is provided with brakes on all four wheels, these brakes being controlled by a brake lever 120. This lever is connected to a shaft 122 having crank arms 124 at its opposite ends. Each crank arm is connected by a link 126 to a pair of thrust rods 128 attached to the brake shoes 130. These shoes are pivotally mounted by links 132 on a supporting bar 134 attached to uprights 136, which form part of, or are attached to, the frame of the car.

In accordance with the present invention, I have provided a special lightweight adjustable handle construction for facilitating the removal of and replacement on the railroad track of the lightweight motor car which I have thus far described. In the drawings I have shown my motor car as having a pair of handles 140 at each end thereof. Each of these handles comprises a grip portion 142, which may be formed of a length of pipe and which is bent adjacent one end, as indicated at 144 (Fig. 5), and attached to a second length of pipe 146, which is preferably flattened to give it an oval cross section, as clearly shown in Figs. 6 and 7. Each oval section 146 is slidably mounted in a sleeve 148, which is likewise of oval cross section, to prevent rotation of oval section 146 about its axis. Stops 150 are provided to limit movement of the handles in their associated sleeves 148.

The sleeves 148 are inclined, as clearly shown in Fig. 5, and are attached to the body of the motor car by the straps 152 and 154 and plate 156, which may be welded or otherwise suitably joined to the motor car body. In the retracted position shown in Figs. 4 and 5, the inner ends of the handles extend through slots 158 in the car body, and springs 160 prevent rattling of the handles while in retracted position.

From the foregoing description, it will be readily apparent to those skilled in the art that the handles 140 may be pulled outwardly from the position shown in Figs. 4 and 5 in order to increase the operator's leverage for raising an end of the motor car and removing it from, or replacing it upon, the railroad tracks. As the handles are slid outwardly, their grip portions 142 are raised so that any desired height for these grip portions can be secured by withdrawing the handles from the retracted positions an amount corresponding to the height of grip desired. When the motor car is being operated on the track, it is desirable to have the handles in retracted position, as in this position they are less likely to interfere with the railroad employees in the performance of their duties.

The motor car includes also a skid arrangement to facilitate removal of the motor car from, or the replacing of it upon a railroad track. Referring particularly to Figs. 1, 3 and 5, it will be seen that the arrangement includes a skid rail 170 which is located below the frame of the motor car and in front of the front axle thereof. This skid rail 170 is attached to the motor car frame by uprights 172 spaced longitudinally of the skid rail 170 and attached thereto and to the motor car frame by welding or in any other suitable manner.

As the motor car is being removed from the railroad track, it is lowered upon one of the track rails until this skid rail engages the track rail. The front end of the motor car can then be slid crosswise of the track rail for the full length of the skid rail 170, so that during this movement, the weight of the motor car rests upon the track rail instead of being carried by the operator.

This skid rail 170 is also advantageous in preventing injury to the front axle of the motor car during removal and replacement of the car upon the track. As most clearly shown in Fig. 5, the skid rail 170 is located beneath the front axle so that when the front end of the motor car is lowered, the skid rail will engage a track rail before the latter can strike and injure the front axle. It is further to be noted that while the skid rail 170 is below the axles 22, it still is well above the cross ties and ballast and is high enough to avoid switches, guard rails and other appurtenances located between the main track rails.

In Figs. 10, 11, 12 and 13, I have illustrated diagrammatically a preferred manner of removing my motor car from a conventional railroad track. Fig. 10 shows the motor car in operating position on the track. With the car in this position, the operator grasps the pair of handles A and pulls them outwardly to secure the desired leverage and elevation of the handle grips. He then lifts this end of the car off of the rails and swings the car through an angle of ninety degrees until it assumes the position shown in Fig. 11. He then lowers the car, which causes the brake supporting bars 134 to rest upon the near rail C, and since the wheels adjacent the handles A are farther from the rail C than the other pair of wheels, the latter are lifted from the ground as the former are lowered.

The operator next walks around to the other end of the car and grasps and adjusts the handles B to provide the desired leverage and height of grip. He then slides the car on the rail C in the direction of the arrow in Fig. 11 until the wheel E engages rail C, whereupon he lifts on the handles B sufficiently to raise this wheel over the rail C, whereupon the car assumes the position shown in Fig. 12. In this position, the skid rail 170 and one of the brake supporting bars 134 rest upon rail C.

The operator next slides the end B of the car in the direction of the arrow in Fig. 12 until the wheel F engages rail C, whereupon he raises the handles B sufficiently to lift this wheel across the rail and swing the car to the position shown in Fig. 13. From the foregoing description it will be seen that the novel construction of my motor car permits it to be removed from the track with a minimum amount of lifting and a minimum amount of exertion on the part of the operator. Similarly, in replacing the car on the track, minimum amounts of lifting and manual exertion are required.

My novel motor car may be quickly and easily removed from a railroad track by a single operator of ordinary strength and may be as quickly and easily replaced by the same operator. This is particularly important where the motor car is used on a busy track, since it conserves the strength of the operator and materially reduces the amount of time wasted in removing and replacing the motor car.

While I have illustrated and described only a single embodiment of my invention, it is to be understood that my invention is not limited to the details illustrated and described but may assume numerous other forms, and that the scope of my invention is defined by the following claim.

I claim:

In a motor car of the type including a body having a floor and two pairs of wheels located near opposite ends of the body for supporting the body on a railroad track, the combination including, a pair of handles at each end of the car, each of said handles comprising a tubular grip having generally horizontal outer end and a non-circular portion extending from said grip at a substantial angle generally downwardy and inwardly, each pair of handles being located between the pair of wheels adjacent the corresponding end of the car and said floor being apertured slidably to receive the non-circular portions of said handles, short handle guiding means secured above the floor slidably receiving the non-circular portions of the handles, stops at the ends of the non-circular portions for limiting the extent of movement of the handles and preventing withdrawal thereof, and resilient means engaging the non-circular portions of the handles and secured to the body for preventing rattling of the handles in their retracted positions.

DWIGHT RICHARDS.